Patented Sept. 7, 1954

2,688,631

UNITED STATES PATENT OFFICE 2,688,631

PROCESS FOR PREPARING DICYANO STILBENES

William G. Toland, Jr., Richmond, Calif., assignor to California Research Corporation, San Francisco, Calif., a corporation of Delaware No Drawing. Application September 26, 1949, Serial No. 117,944

3 Claims. (Cl. 260—465)

This invention relates to a new and improved process of preparing useful polyfunctional compounds. More particularly, the invention relates to a new and improved process of preparing polyfunctional, polyaryl compounds by the polymerization of functional group substituted toluenes.

Polyfunctional compounds, that is, compounds which possess more than one functional group, are in great demand in chemical industry because of their high degree of reactivity and consequent suitability as intermediates in the preparation of many important chemical products. Where the functional groups of the polyfunctional compound are separated by sufficient space in the molecule, as in the case of polyfunctional type polyaryl compounds having a functional group on each of the aryl nuclei, the compounds are even more desirable because of the higher degree of stability inherent in the chemical products derived from them.

Polyfunctional compounds having the functional groups distributed on more than one aryl nucleus have been prepared by various methods known to the art. However, the prior processes involve a multiplicity of complicated, expensive steps; and where the yields of the preparation are disclosed, they prove to be poor. By-products formed in these previous type preparations of polyfunctional compounds having polyaryl type structures are numerous and complicate purification or render the product incapable of separation.

One of the processes proposed for the preparation of polyfunctional, polyaryl compounds that may be considered illustrative of the prior state of the art is that disclosed in an article by Hager, Van Arendonk and Shonle, appearing in the Journal of the American Chemical Society, Volume 66, page 1982, in 1944. In this article, the authors disclose a process wherein dibenzyl was brominated in the 4,4' and alpha,alpha' positions to produce 4,4'-alpha,alpha' tetrabromo diphenyl ethane. This compound was then converted to the polyfunctional diaryl 4,4'-dicyano stilbene by treatment with cuprous cyanide. Alcoholysis of the nitrile radicals was used to produce another type of di-functional di-aryl compound, namely, the di-ethyl ester of 4,4'-stilbene dicarboxylic acid. This product in turn was saponified to produce still another polyfunctional compound, namely, the 4,4'-stilbene dicarboxylic acid. The polyfunctional stilbene dicarboxylic acid product was obtained only in a very low yield.

Another and more recent disclosure of a process for preparing polyfunctional type polyaryl compounds is an article by Bell and Waring which appeared in the Journal of the Chemical Society for July 1948, on pages 1024–6, inclusive. In this article para-cyano-benzaldehyde and para-cyano-benzyl-cyanide were heated and treated with piperidine to give the polyfunctional compound α-4,4'-tricyanostilbene. This polyfunctional compound upon hydrolysis with $H_2SO_4$ and acetic acid produced the polyfunctional α-cyano-4,4'-stilbene dicarboxylic acid. The alpha-cyano-4,4'-stilbene dicarboxylic acid was in turn heated with potassium hydroxide to give alpha-4,4'-stilbene tricarboxylic acid.

In addition to the poor yields and numerous by-products characteristic of previous preparations of polyfunctional compounds of more than one aromatic nucleus, it may also be noted in both of the above illustrations that several steps involving the formation of intermediate products were necessary. This fact, as well as the consumption in the processes of relatively expensive reagents, serves to emphasize the lack of commercial feasibility in the previous processes for preparing polyfunctional, polyaryl type compounds.

I have discovered that polyfunctional compounds of the polyaryl type having a functional group on each of the aryl nuclei can be prepared by heating toluenes substituted with a single functional group to an elevated temperature in the presence of sulfur to dehydrogenate and concurrently polymerize said functional group-substituted toluenes. These toluenes may be more particularly described as those which are substituted on the benzene nucleus by a single carbon having no hydrogen atoms attached. That is, all of the valences of the carbon atom substituent are completely taken up or occupied by elements other than hydrogen. These particular functional group-substituted toluenes may be conveniently illustrated by the following molecular type structures:

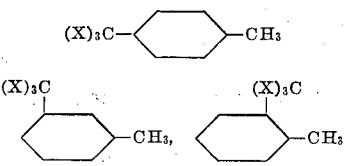

In the above formulae, X is any element or the hydrogen equivalent of any element other than hydrogen. Examples of such elements are oxygen; nitrogen; halogens such as chlorine, bromine and fluorine; carbon which in turn has been completely substituted by elements other than hydrogen, as, for example, pentachloro ethyl; and others. Illustrative of functional group substituents possessing these characteristics are —CN; —COOH; —COOM where M is a metal or the hydrogen equivalent of a metal, such as Na, K, Ca, Mg, Cu, Pb, etc.; —COOCH₃; —COOT where T is a phenyl or substituted phenyl radical; —COCl, etc. Preferably, the functional group substituents illustrated by the radical —C(X)₃ possess a high degree of inertness in the presence of sulfur under my reaction conditions in order to prevent any tendency of their entering into the polymerization reactions.

The following equations are illustrative of the principal reactions involved in the preparation of polyfunctional, polyaryl type compounds according to the process of my invention:

I.
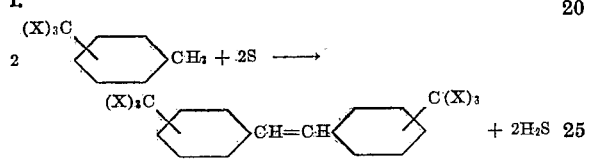

II.
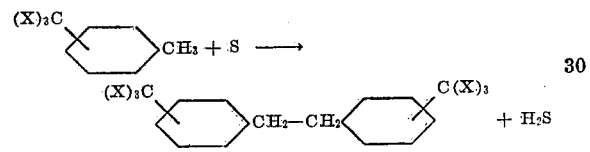

III.
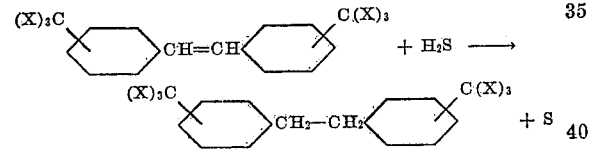

IV.
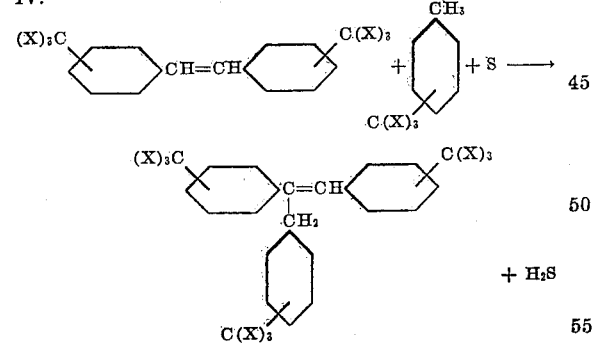

V.
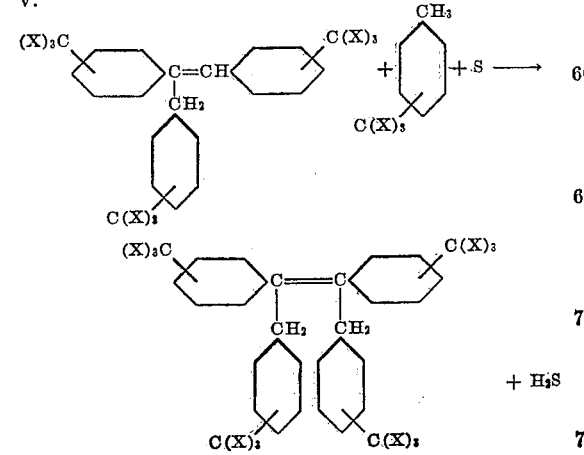

VI.
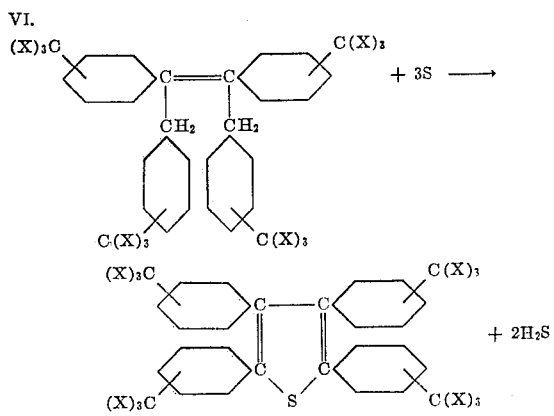

As indicated in the above illustrations, the functional group-substituted toluenes from which the polyfunctional, polyaryl compounds are prepared according to the present invention may be either the ortho-, meta- or para-isomers of the functional group-substituted toluenes or mixtures thereof. The para-isomers of the substituted toluenes have been found to lend themselves readily to the process of preparing polyfunctional, polyaryl compounds of the type such as stilbene dicarboxylic acid and tetra(carboxy phenyl)-thiophene since the relatively high insolubility of the products in the reaction mixture makes them easily separable.

Mixtures of the isomers of the substituted toluenes may be utilized in the process of my invention with little or no change in the reaction conditions. This permits the use of various isomers of functional group-substituted toluenes, as well as mixtures thereof which may be obtained from any practical source. One source, for example, in the case of preparing polyfunctional, polyaryl compounds such as the stilbene dicarboxylic acids and tetra(carboxy phenyl) thiophene, that has been found suitable for the preparations according to the process of the present invention is the production of toluic acid and isomeric mixtures thereof by the partial oxidation of xylenes and their isomeric mixtures. Other of the functional group-substituted toluenes may be derived from a similar primary source, as, for example, in the preparation of nitrile-substituted toluenes, methyl carboxylate-substituted toluenes, phenyl carboxylate-substituted toluenes, metal carboxylate-substituted toluenes, etc.

The sulfur of the reaction may be present in any of its elemental forms. Other types of active sulfur besides elemental sulfur and H₂S may also be utilized in the reaction. For example, active sulfur derived by using various sulfur compounds such as H₂S, SO₂, CS₂, etc., with dehydrogenation catalysts, as well as other sources, may be used in the process. For the purposes of the experiments whereby the improved process according to the present invention was derived, it was found that flowers of sulfur were suitable.

Although the reaction will occur over a wide range of elevated temperatures, a particularly suitable range, depending on whether the reaction is carried out in the liquid phase or in the vapor phase, may vary from about 200° F. up to 1200° F. A preferred range of reaction temperatures, particularly for liquid phase reactions, is from about 300° F. to 600° F. In the preparation of polyfunctional, polyaryl compounds of the type such as stilbene dicarboxylic acids and tetra(carboxy phenyl)thiophenes, it has been found that the reaction proceeds favorably in the range from about 450° F. to about 550° F., while the preferred range is from about 475° F. to about 500° F. The reaction will also occur with a wide variety in the proportions of the functional group-substituted toluene and the sulfur. In some instances, the sulfur may be present in such an excess over the substituted toluene as to cause the reaction to be carried out in a sulfur phase or medium of molten sulfur. As high as 4 mols or more of sulfur to 1 mol of functional group-substituted toluene will be satisfactory. For the purpose of the experiments whereby the process of the present invention was discovered, it was found that proportions ranging from about 5 to about 50 mol per cent of sulfur based on the substituted toluene were particularly satisfactory. A more preferred range of proportions has been found to be from about 10 to about 35 mol per cent of sulfur.

The pressure at which the reaction, according to the process of my invention, is carried out may be atmospheric, superatmospheric, or subatmospheric. The superatmospheric pressures may range all the way up to several thousand pounds per square inch depending on the capacity of the equipment utilized. A preferred range of pressures is that ranging up to the critical pressure of hydrogen sulfide, which is in the vicinity of about 89 atmospheres. The subatmospheric pressures may be as low as 20 millimeters or lower, depending on what vacuum may be practicably maintained in the equipment utilized for the process.

When proceeding under superatmospheric pressures of $H_2S$, bibenzyl di-functional compounds are formed according to the preceding equations. The higher partial pressure of $H_2S$ on the system promotes the formation of bi-benzyl type poly-functional compounds. On the other hand, the lower the partial pressure of $H_2S$ on the system, the greater is the proportion of di-functional stilbene and tetra-functional phenyl thiophene type compounds formed. A particularly desirable range of $H_2S$ pressures to promote the formation of bi-benzyl di-functional compounds is from about 5 to about 50 atmospheres. In such cases, it is even more preferred to pre-pressure the reaction system with $H_2S$ before the reaction commences.

The reaction is considered complete when $H_2S$ is no longer evolved on continued heating of the reactants.

If desired, an inert diluent may be used as a medium for the reaction. Although such diluents tend to greatly facilitate the various steps in performing the reaction and overcome any tendency of the products to sublime in cases where high temperatures are utilized, there is an accompanying decrease in the rate of reaction which indicates that the use of diluent ultimately depends upon the particular reaction conditions such as temperature and pressure used in the process of preparing the polyfunctional, polyaryl compounds according to the present invention. In selecting a diluent, its effect upon the solubility of the product of the reaction should also be considered since a diluent which decreases the solubility of the desired polyfunctional reaction product increases the yield of the product by removing it from further reaction with the sulfur. The inert diluent should also be selected from among those possessing high boiling points whenever high temperatures of reaction are utilized during the preparation unless, of course, the reaction is carried out in the vapor phase, in which case a diluent would also likely be vaporized. The term "inert diluent" should be understood for the purposes of the process as including those which are substantially inert toward sulfur, hydrogen sulfide and the functional group-substituted toluenes, as well as the polyfunctional compounds derived from the reaction. One diluent that was used and found suitable for the purposes of this invention was diphenyl ether.

Diluents that have the effect of promoting the formation of a desired product of the substituted toluene and sulfur reaction may also be used to an advantage in the process of the invention. As an example of diluents of this type, quinoline has been found to favor the formation of the tetra-functional, tetra-phenyl thiophene.

Any suitable method of isolating the polyfunctional, polyaryl compounds from the reaction mixture that is known to the art may be utilized. The use of selective solvents may be adapted to the separation stage. Filtration of the desired product, if sufficiently insoluble in the reaction mixture, may also be resorted to. In the case of polyfunctional, polyaryl compounds such as the stilbene dicarboxylic acids, separation may be accomplished by diluting the reaction product with xylene, followed by hot filtration. This removes nearly all of the stilbene dicarboxylic acids as an insoluble amorphous powder. Once the polyfunctional, polyaryl compounds have been recovered, they may be further purified by additional solvent washing or by sublimation. Direct distillation of the unreacted substituted toluenes from the polyfunctional reaction product may also be carried out. In some instances, a high boiling oil will be found necessary in the distillation process to prevent charring of the polyfunctional, polyaryl product in the distillation pot.

To illustrate in detail the process of this invention, and to guide those skilled in the art in the practice thereof, the following examples and data obtained thereby are submitted. However, it must be clearly understood that the invention is not limited to these examples nor is it to be restricted by them.

*Example I.—p,p'-Dicyanostilbene from p-tolunitrile and sulfur*

To a 200 cc. shaker autoclave was charged 56.0 g. p-tolunitrile (0.48 mol) and 1.6 g. sulfur flowers (0.05 mols), and the autoclave sealed and heated to 500–550° F. for 8 hours, with shaking. Maximum pressure reached was 80 p. s. i. g. After cooling to room temperature, the autoclave was opened and 54.1 g. of liquid product was recovered. This was steam distilled to recover 38.9 g. of unreacted p-tolunitrile. The organic layer in the pot was extracted with 50 cc. hot pyridine, which was then chilled and filtered to give 0.4 g. dark yellow solids. This was recrystallized from benzene to give 0.3 g. light orange-yellow p,p'-dicyanostilbene, M. P. 289–291° C. The ultra-violet spectrum showed the characteristic peaks of this type stilbene structure.

*Example II.—Preparaton of p,p'-stilbene dicarboxylic acid and tetra(p-carboxy phenyl) thiophene*

A four-necked round bottom flask, fitted with a thermometer, a two-foot air condenser, stirrer, and nitrogen sweep line, was charged with 136.1 g. (1 mol) p-toulic acid and 32.0 g. (1 mol) flowers of sulfur. The pot was electrically heated. The outlet from the air condenser led to a caustic scrubber. The temperature of the reactants was increased from 225° C. to 300° C. (436–572° F.) over a 3-hour period, during which a rapid stream of H₂S was evolved and continually flushed from the reactor with nitrogen. Products began solidifying even at 300° C., and had a yellow-brown color. The scrubber gained 27.7 g., and analysis showed the presence of 25.2 g. sulfur. The reactor lost 31.6 g. in weight. It was broken open to remove products which were then ground to a fine powder weighing 133.7 g.

One hundred grams of the product was treated with a solution of 50 g. KOH/1 liter of water while hot. A residue of 8 g. black coke with some free sulfur and other yellow-colored bodies remained caustic insoluble. The aqueous KOH extract was chilled to room temperature, and the insoluble potassium salt of p,p'-stilbene dicarboxylic acid crystallized out. The filtrate was concentrated and chilled to recover additional quantities of stilbene acid salt. Combined potassium salts were washed and recrystallized twice from hot water. The final crystals appeared as faint lemon yellow plates and needles. All filtrates were processed to reclaim either the insoluble potassium salt or were added to the dark-colored mother liquors containing water-soluble salts. All insoluble stilbene acid salts were combined, dissolved in hot water, and the free acid liberated by pouring into hot 5% H₂SO₄. This gave a white flocculent precipitate which was boiled to coagulate and was filtered hot, washed with hot water, refiltered, and dried. Weight of p,p-stilbene dicarboxylic acid obtained was 31.7 g.

Neutral Equivalent=135.5 (Theoretical=134.1)
Melting Point=860° F. (Sealed tube)

|  | Found | Theory |
| --- | --- | --- |
| Percent C | 70.94 | 71.6 |
| Percent H | 4.52 | 4.48 |

The dark brown solution of water-soluble salts was acidified by pouring into hot 5% H₂SO₄, boiling to coagulate, and filtering hot. The precipitate of liberated organic acids, yellow-green to brown in color, was washed with hot water from which 2.5 g. unreacted p-toluic acid was recovered by chilling, filtering, washing, and drying. The colored insoluble acid fraction was then dried and found to weigh 44.0 g. Five grams of this material were heated on a watch glass to sublime out 1.8 g. remaining p-toluic acid.

The nonvolatile dark yellow residue proved to be nearly pure tetra(p-carboxy phenyl)thiophene.

Neutral equivalent=141.8 (Theoretical=141.1)
Melting point=598–600° F. (charred)

It showed a positive elemental test for sulfur by fusion. Its insolubility in standard solvents and its stability toward fusion and complete combustion made determination of molecular weight, per cent sulfur, carbon, and hydrogen practically unreproducible. Permanganate oxidation yielded terephthalic acid.

Although in the preceding examples sulfur was present in the reaction mixture in approximately equimolar proportions or less, other and larger proportions of sulfur as previously indicated may be utilized. Larger amounts of sulfur are particularly suitable for reactions wherein the sulfur concentrations are maintained at a fairly low level by slow, continuous addition of sulfur during the reaction period. When the sulfur is added in small increments, according to this variation of the process, sufficient time is allowed between additions so that the reaction may be substantially complete or as nearly complete as desirable before additional sulfur is added.

Since the preceding examples were conducted on a small laboratory scale where little loss of substituted toluene by sublimation was encountered, the inert diluent suggested above was not utilized. However, it has been found that in preparations involving larger proportions of reactants and in efforts to fluidize the operations, as in the case of continuous processes, the use of solvents greatly simplifies the handling of the various materials. Furthermore, any tendency toward sublimation of reactants such as the functional group-substituted toluenes is practically eliminated by the use of inert solvents. In addition, by selecting a diluent having a tendency to decrease the solubility of the desired polyfunctional compound in the reaction medium, higher initial yields are obtained. However, it is not to be assumed from the above discussion that diluents are essential to the reaction according to the process of my invention. In some instances, they may slow down the reaction to such a degree as to be altogether undesirable.

On comparison with the previous methods known to the art, the advantages of the process of my invention in preparing polyfunctional compounds of a polyaryl type through dehydrogenation and polymerization reactions which occur on heating functional group-substituted toluenes in the presence of sulfur are readily apparent. For instance, in the preparation of polyfunctional, polyaryl compounds practiced in the prior art, the yields were consistently poor whenever they were mentioned; and the by-products formed during the reactions were numerous and rendered the desired product difficultly separable. In the process of my invention, the yield of polyfunctional, polyaryl compounds is excellent, while the formation of difficultly-separable by-products is kept at a minimum. Furthermore, it may be observed that the process of my invention involving concurrent dehydrogenation and polymerization of the functional group-substituted toluene is essentially a single-stage reaction utilizing as starting materials relatively inexpensive compounds. In the prior art it is observed in comparison that several steps were necessary in practically every process for the preparation of polyfunctional, polyaryl compounds. The steps also usually involved the formation of intermediate products which in turn tended to complicate the process.

The polyfunctional, polyaryl compounds prepared by the process of my invention have many possible uses. For example, the ester derivatives of the polyfunctional, stilbene dicarboxylic acids and tetra(carboxy phenyl)thiophenes may be suitable as plasticizers for different resinous products. These polyfunctional acid type polyaryl compounds also may be used to form alkyd resins or synthetic drying oils. Since the di-functional di-aryl compounds possess a linkage between the aryl groups of the stilbene type, they are capable of fluorescence typical of stilbene structures, and their derivatives may be suitable for the preparation of fluorescent dyes. Many other uses known in the art for polyfunctional compounds may be supplied with products derived according to the process of my invention.

In view of the foregoing illustrations and specific embodiments of the preferred process conditions for my invention, various modifications utilizing the principles of my invention will be apparent to one skilled in the art. My invention contemplates all such variations and modifications as come within the scope of the appended claims.

I claim:

1. A process of preparing dicyano stilbenes from cyano nuclear-substituted toluenes which comprises dehydrogenating and concurrently dimerizing cyano-substituted toluenes at the methyl radical by heating said toluenes to an elevated temperature in the range between about 200° F. to about 1200° F. in the presence of sulfur for a period of time sufficient to complete the reaction as indicated by $H_2S$ no longer being evolved and separating the dicyano stilbene products from the reaction mixture.

2. A process of preparing dicyano stilbenes from cyano nuclear-substituted toluenes which comprises dehydrogenating and concurrently dimerizing cyano-substituted toluenes at the methyl radical by heating said toluenes with about 5 to 50 mole per cent of sulfur at a temperature of from about 450° F. to about 550° F. for a period of time sufficient to complete the reaction as indicated by $H_2S$ no longer being evolved and separating the dicyano stilbene products from the reaction mixture.

3. A process of preparing dicyano stilbenes from cyano nuclear-substituted toluenes which comprises dehydrogenating and concurrently dimerizing cyano-substituted toluenes at the methyl radical by heating said toluenes with about 5 mole per cent sulfur at a temperature of about 500 to 550° F. for a period of about eight hours and separating the dicyano stilbene products from the reaction mixture.

References Cited in the file of this patent

UNITED STATES PATENTS

| Number | Name | Date |
|---|---|---|
| 2,610,191 | Toland | Sept. 9, 1952 |

OTHER REFERENCES

Baumann, Chemische Berichte, 28, pages 890–895 (1895).

Aronstein, Travaux-Chimiques des Pas-Bas, 21, pages 448–459 (1902), QDIR 3.